May 28, 1929.　　　　　E. W. ZEH　　　　　1,715,180
SAFETY CONTROL FOR POWER PRESSES
Filed Dec. 13, 1926　　　2 Sheets-Sheet 1
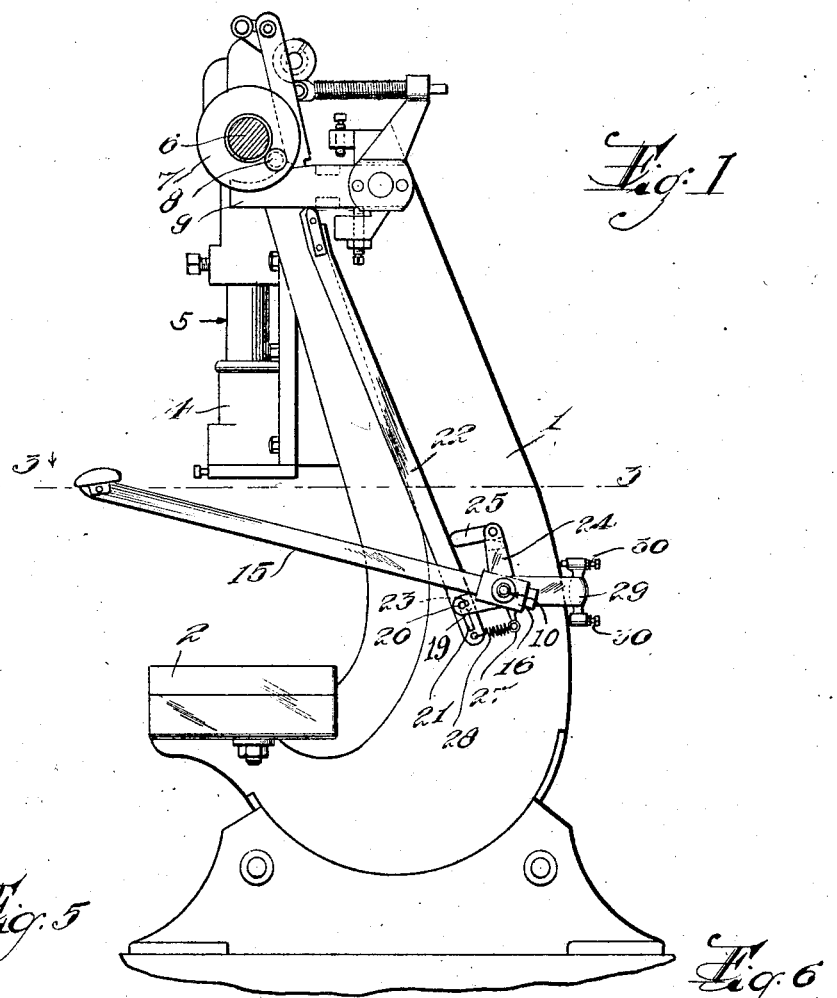
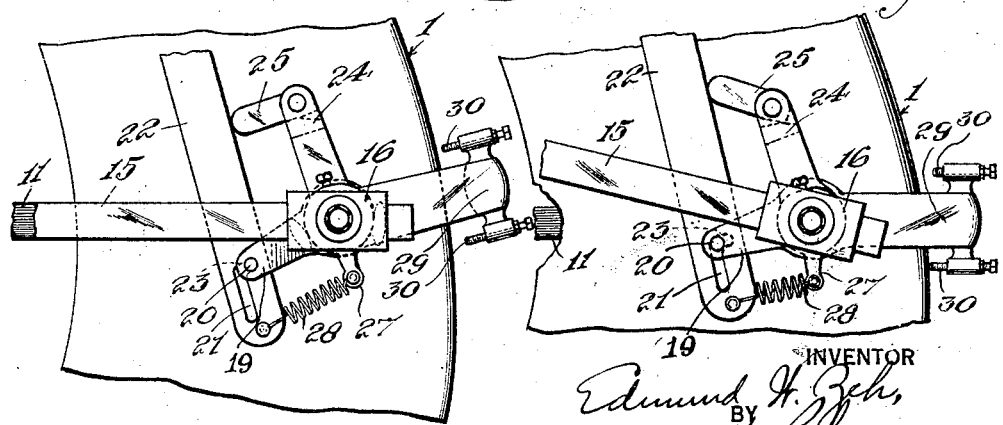

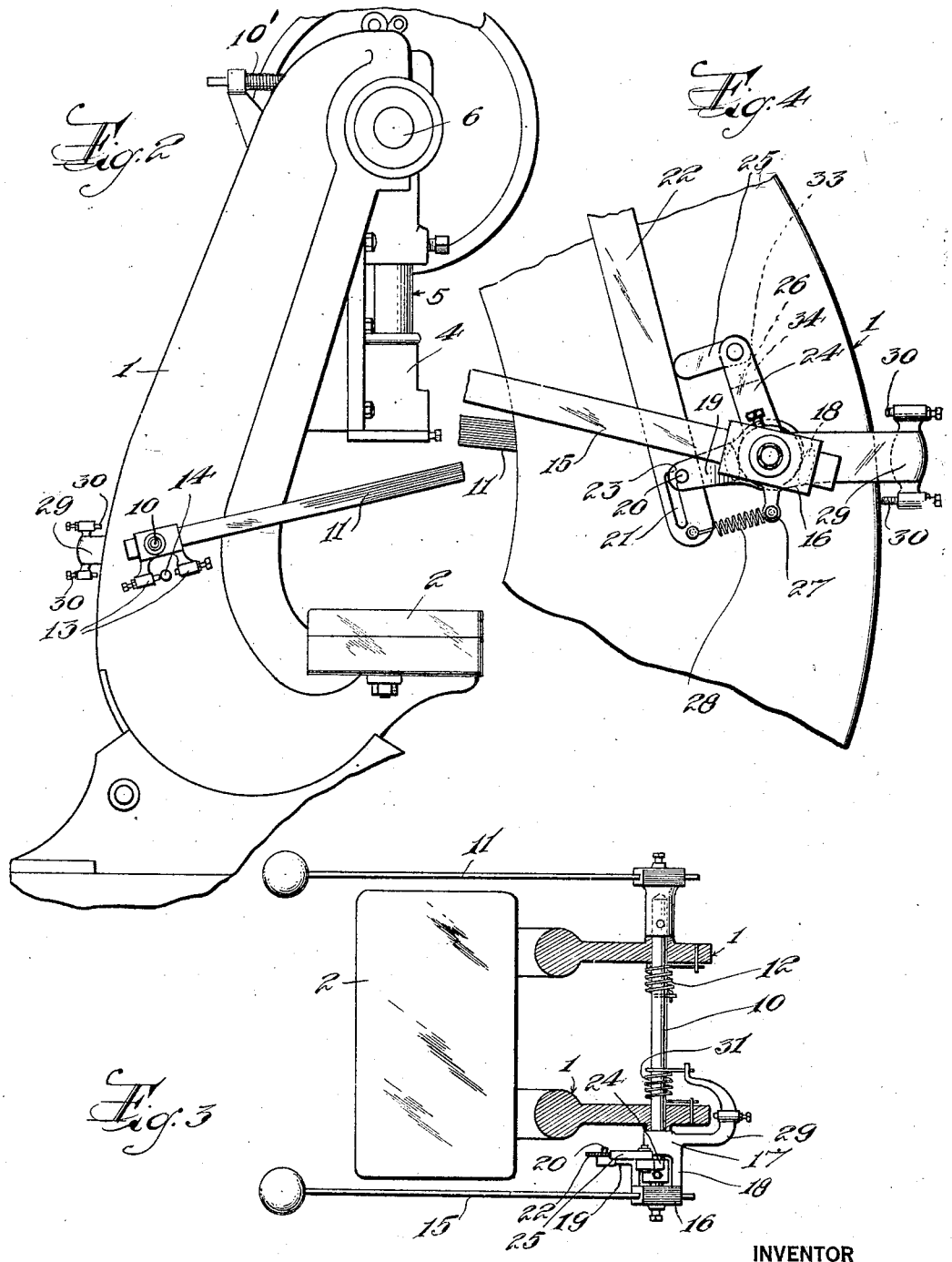

Patented May 28, 1929.

1,715,180

UNITED STATES PATENT OFFICE.

EDMUND W. ZEH, OF NEWARK, NEW JERSEY.

SAFETY CONTROL FOR POWER PRESSES.

Application filed December 13, 1926. Serial No. 154,376.

This invention relates to apparatus for reducing or preventing injury to operators of power presses or similar machines by rendering it practically impossible for an operator to insert either hand between the dies of the press or other moving parts of the machine while the press or machine is in operation, for example while one die is moving toward the other; and more particularly the invention contemplates the constant employment of each hand of the operator at one safe position to start the machine in operation so that the machine cannot be started while either hand is otherwise engaged, as in adjusting work between the dies, whereby possibility of injury to the hand by the moving parts of the machine is eliminated.

One object of the invention is to provide control mechanism for a machine which shall require manual operation and employment of both hands of the operator at certain positions at the same time for actuation, to start the machine in operation, said means being automatically actuated so that upon removal of either hand from said certain position it is necessary to release the other hand before operation of the machine can again be started after stopping.

Another object is to provide mechanism of the character described comprising two series of parts, each series to be actuated by one hand of the operator and said two series being arranged to cooperate so that both must be manually actuated in a certain order to start operation of the machine, each series being automatically returned to normal position upon manual release thereof.

Other objects are to provide such a mechanism whereby it is impossible after the machine has stopped to start the machine until both series of parts have been released to normal position; to provide a mechanism of this character wherein each of said series of parts is operated by a different hand lever which is disposed at a safe position relative to the moving parts of the machine and convenient with respect to the operator and the work bed of the machine; to thus provide a safety apparatus which is foolproof and will prevent injury to the operator's hands in spit of any attempts he may take to "beat" the apparatus or use his hands while the machine is being started for any purpose other than to properly operate said mechanism; to provide such a safety apparatus which may be utilized in connection with many different types of control mechanisms so as to have a wide field of use; to provide a safety device which shall be simple and inexpensive in construction and operation, and to obtain other results and advantages as may be brought out by the following description.

Referring to the accompanying drawings, in which corresponding and like parts are designated throughout the several views by the same reference characters, Figure 1 is a side elevation of a power press showing a safety apparatus embodying my invention applied thereto, the driving wheel being omitted for clearness of illustration;

Figure 2 is an elevation of the side of the press opposite that shown in Figure 1;

Figure 3 is a horizontal sectional view, taken on the line 3—3 of Figure 1;

Figure 4 is an enlarged fragmentary side elevation of the control apparatus illustrated in Figure 1, showing the first step in the operation of the control apparatus to start the press;

Figure 5 is a similar view, showing the second and last operation of the control apparatus for starting the press, and Figure 6 is a view similar to Figure 5, showing the effect of the operator releasing one of the control levers whereby the operation of the press is automatically stopped.

For the purpose of illustrating the principles of the invention, I have shown it in connection with a control mechanism for a power press of known construction which includes a frame 1 having a bed 2, and head 4 adapted to be reciprocated by a pitman 5 upon the eccentric (not shown) of a shaft 6 journaled in the upper part of said frame 1. A driving wheel (not shown) is loose upon said shaft 6 and adjacent to it is a clutch member 7 fast upon the shaft and carrying a clutch pin 8 normally projected by a spring (not shown) to be engaged by the driving wheel. Said clutch member 7 is annularly slotted, and a throw-out 9 pivoted to swing in the plane of said slot has a free inclined or wedge-shaped end lying in said slot to engage the clutch pin 8 and retract it from the driving wheel. All said parts as described above are old and well-known in the art so that they need no further description or illustration here, their operation being that when the throw-out 9 is swung out of engagement with the clutch pin or downwardly, as illustrated, said clutch pin is automatically projected and engaged by the driving wheel to carry the shaft around with it, but after the throw-out has been released it automatically returns upwardly, as by a spring 10, to again engage the clutch pin at the end of a complete rotation and stop the head 4 in raised position. Obviously the throw-out 9 may be operated by any suitable mechanism which will swing the throw-out up and down about its pivot. For example, mechanism such as that described in my Patent No. 1,630,882, dated May 31, 1927, may be utilized so that when the press is intended to deliver a single stroke it will automatically stop at the end of the stroke and not start again except upon a manual act by the operator. The present invention has nothing to do specifically with the actuation of the throwout 9 except to provide means which will by manual actuation swing the throw-out downwardly and will automatically as by spring actuation permit the throw-out to return upwardly. In fact, the invention may be used in connection with many different types of control mechanisms other than that described.

In the specific embodiment of the invention illustrated in the drawings, a horizontal shaft 10 is journaled for rotation on the frame 1 of the press at the rear of the bed 2, the ends of the shaft projecting beyond the frame at opposite sides of the bed of the press. To one end of the shaft 10 is attached an operating hand lever 11 so that said shaft will rotate upon oscillation of said lever. A helical spring 12 is mounted upon the shaft and has its ends connected respectively to the shaft and the frame 1 of the press so that the torque of said spring normally rotates the shaft to swing the lever 11 upwardly. The lever is provided with opposed stop lugs 13 arranged at opposite sides of a stop pin 14 on the frame 1 to limit movement of the lever 11 in both directions.

Mounted to rotate upon the other projecting end of the shaft 10 is another operating hand lever 15. This lever is formed with two spaced portions 16 and 17 journaled in co-axial relation upon the shaft 10 and integrally or otherwise rigidly connected by a web 18. One of these portions, in the present instance the outer portion 16, is formed with an arm 19 which carries a pin 20 disposed substantially parallel to the shaft 10 and arranged in a slot 21 in one end of a connecting link 22, the opposite end of which is operatively connected with the throw-out 9 in any suitable manner, for example, as shown by my Patent No. 1,630,882 dated May 31, 1927. The slot 21 is right-angular in shape with one arm 23 of the angle extending toward the shaft 10 and the other arm substantially longitudinal of the link 22 and vertical.

Arranged between the portions 16 and 17 of the lever 15 and fixedly connected to the shaft 10 is a crank arm 24 which extends upwardly and has pivotally connected to its upper end one end of a push bar 25 the free end of which normally bears against the adjacent side of the connecting link 22. This push bar 25 is normally held at substantially right angles to the crank arm 24 by a lug 26 which underlies the push bar, as clearly shown in Figures 4 to 6 inclusive, the push bar being free to move upwardly to an extent limited by engagement of an extension 33 with an inclined surface 34 on the lug 26. The crank arm 24 has an extension 27 at the side of the shaft 10 opposite the push bar 25 between which and the end of the connecting link 22 is connected a tension spring 28 which normally swings the lower end of the connecting link 22 with respect to the pin 20 on the arm 19 so that the pin is located in the angle of the slot 21, as shown in Figures 1 and 6 of the drawings. With this construction, it will be obvious that the crank arm 24 will be oscillated by oscillation of the hand lever 11, while the arm 19 and pin 20 will be oscillated by oscillation of the hand lever 15, the movements of the two levers and the directly associated parts being independent of each other. Any suitable stopping means may be provided for limiting oscillation of the lever 15, but in the present instance I have shown the lever formed with a rearward extension 29 at the side of the shaft 10 opposite the arm 19 in which are mounted spaced stop screws 30 which upon oscillation of the lever in opposite directions will engage the frame of the press. A spring 31 is mounted upon the shaft 10 and connected with the extension 29 to normally swing the hand lever 15 upwardly substantially in the same horizontal plane as the lever 11.

It will be observed that the hand levers 11 and 15 are disposed at opposite sides of the bed of the press and that they extend beyond the front of the press at a height convenient to the operator so that they may be operated by merely resting the hands thereon with the fore-arms in approximately horizontal position. To start the press in operation, the hand lever 11 is pushed downwardly with one hand which causes movement of the crank arm 24 toward the link 22 and through the push bar 25 swings the lower end of the connecting link 22 so that the pin 20 is located in the horizontal portion 23 of the slot 21, as shown in Figure 4 of the drawings. While the lever 11 is thus held, the lever 15 is pushed downwardly with the other hand which causes downward swinging of the arm 19 and the pin 20 which through its engagement with the horizontal portion of the slot 21 exerts a downward pull on the connecting link 22, as shown in Figure 5 of the drawings, so that the throw-out 9 is pulled downwardly and the clutch pin 8 permitted to engage the driving wheel. If the hand lever 11 is released the spring 12 will return the lever to its normal position and at the same time move the crank arm 24 and the push bar 25 away from the link 22, whereupon the spring 28 will swing the link to locate the vertical portion of the slot 21 in alinement with the pin 20, after which the spring actuating the throwout 9 will pull the link 22 longitudinally upward with the slot 21 sliding over the pin 20. Should the lever 11 be held in its operative position and the lever 15 released, the arm 19 and pin 20 will be swung upwardly through action of the spring 31, and the frictional engagement between the push bar 25 and the link 22 will cause said push bar to swing upwardly and obliquely to the crank arm 24 as shown in Figure 6 of the drawings, which will permit the spring 28 to swing the link 22 so as to disengage the horizontal portion of the slot 21 from the pin 20 and permit the link 22 to move upwardly and re-engage the throw-out 9. Then to start the press it is necessary to release the lever 11, whereupon the push bar 25 falls by gravity to its normal position, and actuation of the levers 11 and 15 downwardly will start the press as above described.

From the foregoing it will be understood that to start the press in operation, both hands of the operator must be used at the same time, and furthermore, after one lever has been released, it is impossible to start the press until the other lever has been returned to its normal position and the proper sequence of operation of the levers is repeated. Accordingly, it is practically impossible for the operator to use his hands for any other purpose than holding the levers 11 and 15 while the press is being started, and therefore it is practically impossible for either hand to be inserted between the dies of the press while the movable die is in motion.

While I have shown and described the invention in connection with a certain type of power press and a certain control mechanism, it is to be understood that this is primarily for illustrating the principles of the invention and that the invention is susceptible of use with other types of machines and the details of construction may be modified or changed without departing from the spirit or scope of the invention. Therefore, I do not want to be understood as limiting myself in the construction and use of the invention except as required by the following claims when construed in the light of the prior art.

Having thus described the invention, what I claim is:

1. Safety control apparatus for power presses or the like, comprising means for controlling the application of power to a press to operate the same, a pair of operating members each operable by one hand of the operator, means including a plurality of cooperating parts for operatively connecting said controlling means and one of said members to operate said controlling means to start the press upon movement of said member in one direction, means for normally influencing said parts of said connecting means to break said connection between said member and said controlling means, means actuated by the other of said operating members upon movement in one direction for positively relatively moving said parts of said connecting means to make and hold said operative connection, and means for automatically actuating each of said operating members in the opposite directions to break said operative connection between the first-mentioned operating member and said controlling means upon the release of either or both of said operating members by the operator.

2. Safety control apparatus for power presses or the like, comprising means for controlling the application of power to a press to operate the same and including a movable part to be connected to operating means, a pair of operating members each operable by one hand of the operator, means actuated by one of said operating members to operatively connect with said part of said controlling means when in a certain relation thereto to actuate said controlling means to start the press upon movement of said member, means for normally holding said part of said controlling means and the last-mentioned means out of said relation, means actuated by the other of said operating members to actuate said part of said controlling means into said certain relation to said second-mentioned means, and means for automatically actuating and holding said second mentioned means and the last-mentioned means in position to disconnect the first-mentioned means from said part of said controlling means upon release of either or both of said operating members by the operator.

3. Safety control apparatus for power presses or the like, comprising means for controlling the application of power to a press to operate the same, a pair of operating members each operable in one direction by one hand of the operator, said controlling means having a part movable relatively to one of said members, said member and said part of the controlling means having cooperating separable connecting portions whereby said part may be operatively connected with said member when in a certain relation thereto to actuate said controlling means to start the press upon movement of said member in said direction, means for normally holding said part of said controlling means out of said certain relation to said member, means on the other of said operating members for actuating said part into said certain relation upon movement of the second-mentioned member in said direction, and means for automatically and normally actuating each of said members in the opposite directions and holding them so as to maintain said part disconnected from the first-mentioned member upon release of either or both of said members.

4. The apparatus set forth in claim 3 wherein the third-mentioned means includes a movable push bar normally in position to push on said part of the controlling means upon movement of said second-mentioned member in said direction and is actuated relatively to said second-mentioned member by movement of said part upon release of the first-mentioned operating member to permit disconnection of said part from said first-mentioned member while the second-mentioned operating member is held by the operator.

EDMUND W. ZEH.